United States Patent
Inagaki et al.

(10) Patent No.: US 8,745,562 B2
(45) Date of Patent: Jun. 3, 2014

(54) METHOD OF ON-BOARD WIRING

(71) Applicant: Denso Corporation, Kariya (JP)

(72) Inventors: Masashi Inagaki, Kariya (JP); Kouji Ichikawa, Kariya (JP); Makoto Tanaka, Nagoya (JP); Hideki Kashiwagi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/705,229

(22) Filed: Dec. 5, 2012

(65) Prior Publication Data

US 2013/0159954 A1    Jun. 20, 2013

(30) Foreign Application Priority Data

Dec. 16, 2011   (JP) ................................. 2011-276081

(51) Int. Cl.
    *G06F 17/50*   (2006.01)
(52) U.S. Cl.
    USPC ............................ 716/115; 716/110; 716/111
(58) Field of Classification Search
    USPC ....................................................... 716/115
    See application file for complete search history.

(56) References Cited

U.S. PATENT DOCUMENTS

2005/0197817 A1*   9/2005   Iwaki et al. ..................... 703/14
2006/0117289 A1    6/2006   Katagiri
2011/0015817 A1*   1/2011   Reeve ............................. 701/25

OTHER PUBLICATIONS

Office Action mailed Nov. 5, 2013 in the corresponding JP application No. 2011-276081 (English translation).

* cited by examiner

*Primary Examiner* — Paul Dinh
*Assistant Examiner* — Bryce Aisaka
(74) *Attorney, Agent, or Firm* — Posz Law Group, PLC (57) ABSTRACT

A design method of on-board wiring for a designed circuit includes determining a severity as a crosstalk prevention index for a pair of wires based on a generated noise level of a damaging side wire and a permissible noise level of a damaged side wire. The pair of wires is then assigned a severity class (SC) based on the severity determined. The SC is a pre-defined value range(s) for severity classification. Based on a preset SC specific permissible value list, one or more by-design permissible values belonging to the SC is generated for a design element of the pair of wires. A layout of the pair of wires on a board is constructed based on the by-design permissible value.

11 Claims, 10 Drawing Sheets

SC SPECIFIC BY-DESIGN PERMISSIBLE VALUE LIST

| SC | SEVERITY [dB] | BY-DESIGN PERMISSIBLE VALUE OF PARALLEL-RUN DIST [mm] AT INTER-WIRE GAP OF 2mm |
|---|---|---|
| . | . | . |
| 3 | 56 – 60 | 8 |
| 4 | 51 – 55 | 12 |
| . | . | . |

SC SPECIFIC BY-DESIGN PERMISSIBLE VALUE LIST

| SC | SEVERITY [dB] | BY-DESIGN PERMISSIBLE VALUE OF PARALLEL-RUN DIST [mm] FOR SAME-LAYER WIRES | | BY-DESIGN PERMISSIBLE VALUE OF PARALLEL-RUN DIST [mm] FOR ADJACENT-LAYER WIRES | |
|---|---|---|---|---|---|
| | | INTER-WIRE GAP OF 2mm | INTER-WIRE GAP OF 1mm | INTER-WIRE GAP OF 2mm | INTER-WIRE GAP OF 1mm |
| ∙ | ∙ | ∙ | ∙ | ∙ | ∙ |
| 3 | 56 − 60 | 8 | 4 | 6 | 3 |
| 4 | 51 − 55 | 12 | 6 | 10 | 5 |
| ∙ | ∙ | ∙ | ∙ | ∙ | ∙ |

FIG. 8

SPECIFIED PERMISSIBLE VALUE LIST

| WIRE PAIR | SC | (SPECIFIED) BY-DESIGN PERMISSIBLE VALUE |
|---|---|---|
| ⋮ | ⋮ | ⋮ |
| C | 58dB (SC3) | <ADJACENT-LAYER PARALLEL RUNNING><br>INTER-WIRE GAP ≥ 2mm, PARALLEL-RUN DIST ≤ 6mm (SPEC 1)<br>INTER-WIRE GAP ≥ 1mm, PARALLEL-RUN DIST ≤ 3mm (SPEC 2) |
| B | 53dB (SC4) | < SAME-LAYER PARALLEL RUNNING><br>INTER-WIRE GAP ≥ 2mm, PARALLEL-RUN DIST ≤ 12mm (SPEC 1)<br>INTER-WIRE GAP ≥ 1mm, PARALLEL-RUN DIST ≤ 6mm (SPEC 2) |
| ⋮ | ⋮ | ⋮ |

FIG. 11A
GENERATED NOISE FREQ SPECTRUM

DAMAGING SIDE WIRE A

FIG. 11B
GENERATED NOISE FREQ SPECTRUM

DAMAGING SIDE WIRE B

FIG. 11C
GENERATED NOISE FREQ SPECTRUM

DAMAGING SIDE WIRE C

FIG. 11D
PERMISSIBLE NOISE FREQ SPECTRUM

DAMAGED SIDE WIRE

FIG. 12A
GENERATED NOISE FREQ SPECTRUM

FIG. 12B
GENERATED NOISE FREQ SPECTRUM

FIG. 12C
GENERATED NOISE FREQ SPECTRUM

FIG. 13A
PERMISSIBLE NOISE FREQ SPECTRUM

FIG. 13B
PERMISSIBLE NOISE FREQ SPECTRUM

FIG. 13C
PERMISSIBLE NOISE FREQ SPECTRUM

FIG. 14A

FIG. 14B  PRIOR ART 0.5grid
FIRST ADJACENT
SPACING CONDITION

2grid
SECOND ADJACENT
SPACING CONDITION

METHOD OF ON-BOARD WIRING

CROSS REFERENCE TO RELATED APPLICATION

The present application is based on and claims the benefit of priority of Japanese Patent Application No. 2011-276081, filed on Dec. 16, 2011, the disclosure of which is incorporated herein by reference.

TECHNICAL FIELD

The present disclosure generally relates to an on-board wiring design method for laying out the wiring (e.g., copper wires) of a designed electronic circuit in a course of designing and manufacturing of an electronic circuit board.

BACKGROUND

When designing an electronic circuit board, consideration for avoiding crosstalk between two or more wires (i.e., wiring) caused by the electromagnetic induction phenomenon is required.

For instance, in an engine electronic control unit (i.e., engine ECU) installed in a vehicle, a mixed arrangement (i.e., layout) of noisy wiring, which may transmit a digital signal, and sensitive wiring, which may transmit a sensor signal (i.e., usually a weak signal), on one wiring board may present a crosstalk-prone condition. The engine ECU already having many components in a small area is further reduced in size to be squeezed into a small space in a vehicle, thereby forcing the wiring board to have a high-density arrangement of electronic components. Further, an increase of a clock frequency of a microcomputer, which is required in pursuit of a higher speed processing in the microcomputer and of sophistication of the engine ECU functions, may increase the change of crosstalk (i.e., make the crosstalk-prone condition worse).

Conventionally, when an electronic circuit board is manufactured, a crosstalk problem in a trial product stage has been resolved in a trial-and-error method. The trial-and-error method designs a new layout of wiring and evaluates the crosstalk of the newly-designed layout of wiring. However, by such repetition of trials and errors, the development period and the number of manufacturing steps are increased for designing and manufacturing the electronic circuit board such as an engine ECU. Therefore, a new wiring design method, which takes into consideration crosstalk prevention in the first stage of laying out the designed electronic circuit on a wiring board, needs to be developed as a design methodology.

In a related field of large-scale integration (LSI) layout design, a crosstalk-considered wiring method is disclosed in Japanese Patent Laid-Open No. 2006-155120 (JP '120).

Figure 14A:
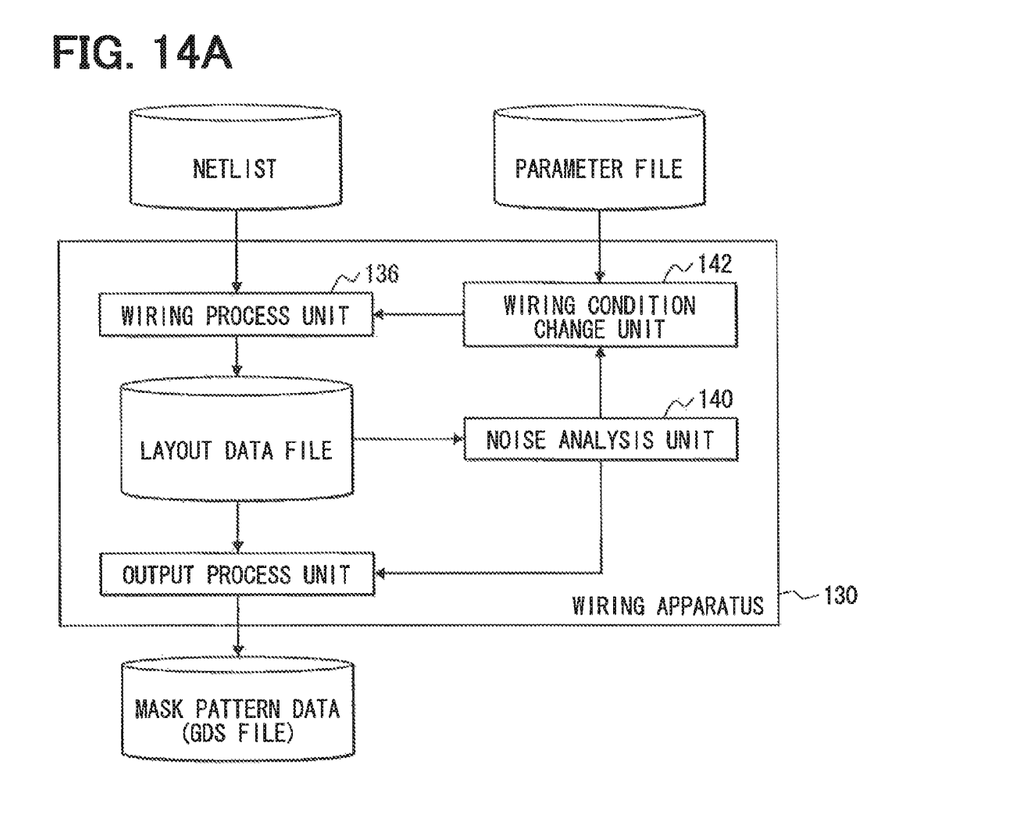
FIGS. 14A, 14B are illustrations of a design rule disclosed in a prior art.
Figure 14B:
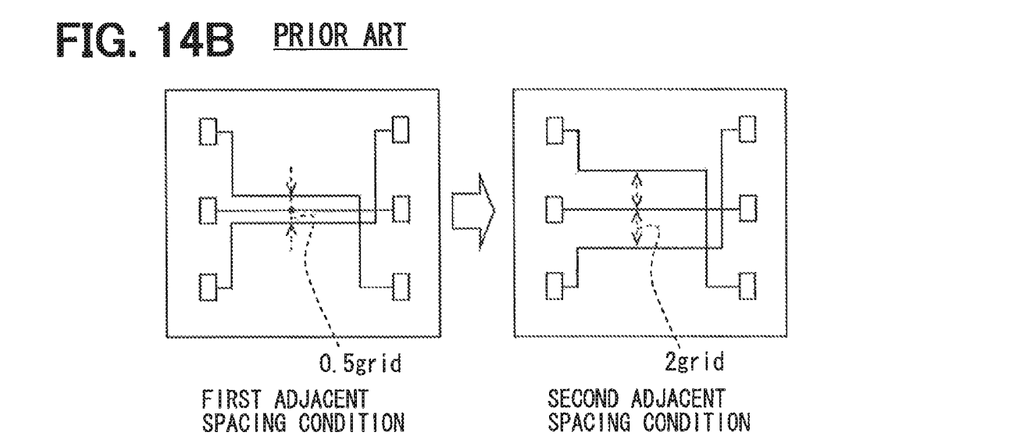

FIGS. 14A and 14B are illustrations describing the wiring method disclosed in JP '120, which is in regards to a flow of each of the processes performed by a wiring apparatus 130 (FIG. 14A) and two spacing conditions for adjacent wires (FIG. 14B).

The wiring apparatus 130 includes a wiring process unit 136 that performs a wiring process based on a netlist of a semiconductor circuit. The wiring process first considers a first adjacent spacing condition as a minimum adjacent spacing condition (FIG. 14B). Subsequently, a noise analysis unit 140 extracts an error net causing a noise error by analyzing a noise of the wiring generated by the wiring process unit 136. A wiring condition change unit 142 applies to the error net that is extracted a second adjacent spacing condition defining a wider spacing than the first adjacent spacing condition, and applies to the other nets, the first adjacent spacing condition for performing the wiring process again.

The wiring method shown in FIGS. 14A and 14B first considers the first adjacent spacing condition as a minimum adjacent spacing condition for all of the nets for performing the wiring process, and then extracts an error net that causes a noise error, such as a crosstalk, by performing a noise analysis. The wiring process is then performed again only for the error nets by applying a new adjacent spacing condition that increases the spacing between wires and for the resolution of the noise error.

The wiring method of JP '120 assumes, as a prerequisite, an after-wiring noise analysis. Further, the wiring method is simply replacing the conventional trial-and-error type noise error countermeasure for the trial products with the repetitious trials and errors of wiring layout design and noise analysis on a simulation basis. Therefore, once the error net is extracted in the noise analysis after the wiring based on the first adjacent spacing condition, the re-wiring is required.

In addition, a large number of wire pairs need to be considered for designing the wiring board of the engine ECU. As a result, if the wiring method of JP '120 is used for designing the engine ECU, a correction of one error net of the extracted wire pair may cause a change at other portions, and may create a new noise problem for the other wire pair, thereby possibly leading to a "whack-a-mole" kind of analysis and re-wiring cycles leading to an increase of man-hours of the design process.

Further, the wiring method of JP '120 performs the wiring process uniformly to all nets (e.g., regardless of the noisiness or sensitivity of the wire), such as applying the first adjacent spacing condition to all wires, performing a noise analysis, and changing the adjacent spacing condition specifically for a portion having a crosstalk problem. Therefore, regardless of the noisiness or sensitiveness of digital signal transmission wiring and sensor signal transmission wiring, the wiring method of JP '120 does not put not-so-noisy wires or not-so-sensitive wires closer than the first adjacent spacing condition, which should otherwise be more closely arranged. As a result, the size of the wiring board and/or the number of wiring layers are increased.

SUMMARY

In an aspect of the present disclosure, a design method of an on-board wiring in a circuit design is described to provide an on-board wiring design method that enable an efficient design of crosstalk prevented wiring boards.

The design method includes first determining a severity for a pair of wires as a crosstalk prevention index. The severity is based on a generated noise level of a damaging side wire and, a permissible noise level of a damaged side wire. Based on the severity determined for the pair of wires, a severity class (SC) is assigned to the pair of wires. The SC is a pre-defined value range(s) for severity classification.

Subsequently, one or more by-design permissible values belonging to the SC that has been assigned to the pair of wires is generated for a design element of the pair of wires. The by-design permissible value is based on a preset SC specific permissible value list. Based on the by-design permissible value, a layout of the pair of wires on a board is constructed.

The design method of the present disclosure is a new and advantageous on-board wiring design method, replacing the conventional method of repeating the wiring layout design and the noise analysis, which is ultimately a trial-and-error method. The design method of the present disclosure enables an efficient wiring board design that prevents crosstalk without noise analysis of the wiring board after designing a layout.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

The embodiment of the present disclosure is described in the following with reference to the drawing.

Figure 1:
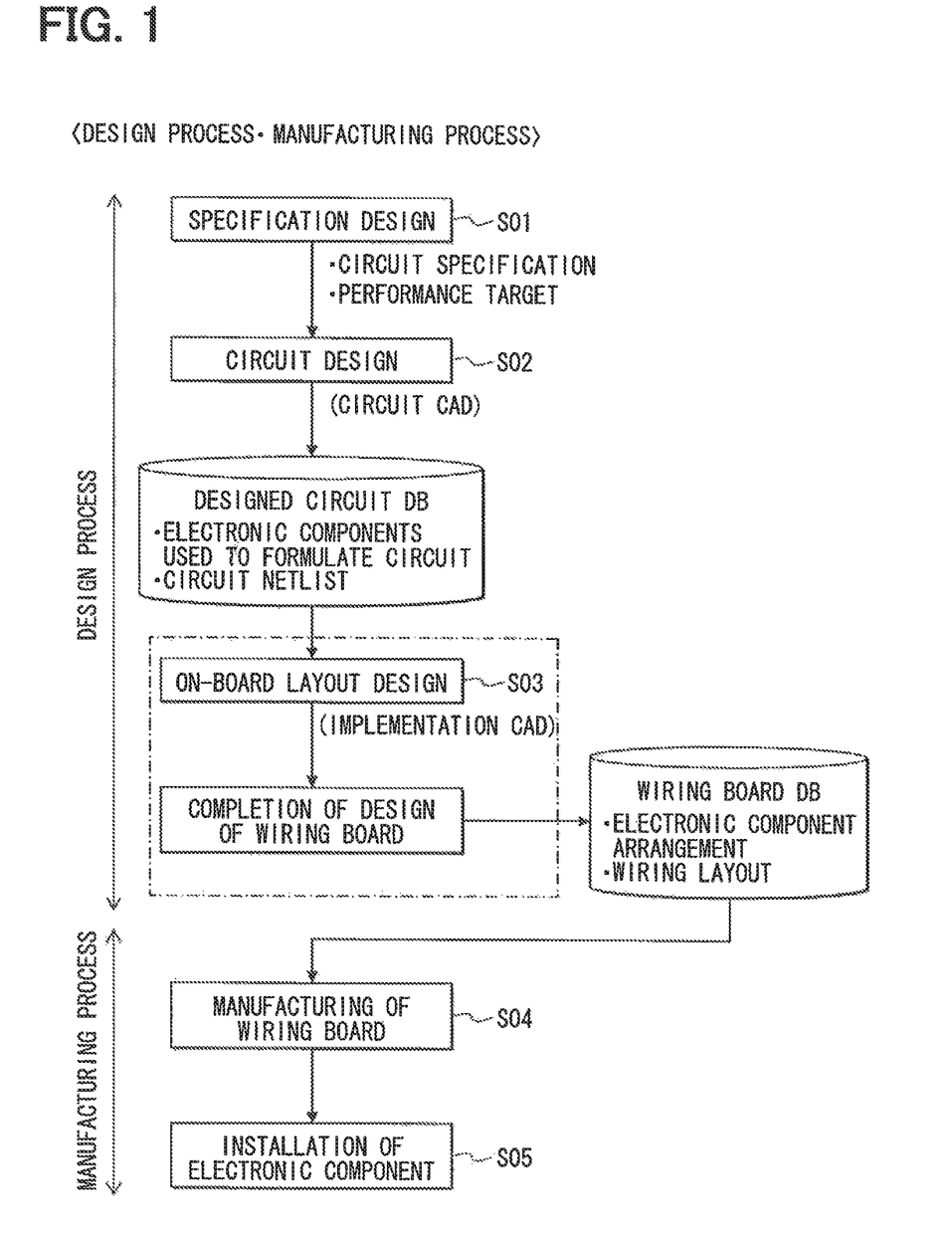
FIG. 1 is an illustration of a design method of on-board wiring positioned within an overall design and manufacturing procedure of an electronic circuit board of the present disclosure.

FIG. 1 is an outline of an overall design and manufacturing process of an electronic circuit board with a design method of an on-board wiring regarding the present disclosure, which is outlined by a dashed line and positioned within the design process.

At S01, a specification design is first performed in the design procedure to determine a circuit specification and a performance target. Using a circuit CAD, a circuit design is performed at S02. The circuit design of S02 determines electronic components to formulate the circuit, and generates a circuit netlist. The data of the circuit design is preserved in a database.

At S03, the layout design is performed to layout the electronic components and the wires on the board. The layout design may be performed by using an implementation CAD, and such layout design is a layout process of converting the circuit design of S02 into a physical arrangement of the electronic components and wires on the board, which is an arrangement of dimensions of the components and wires. When the layout process of S03 is completed, the arrangement of the electronic components and the wiring layout are preserved as data in a wiring board database (DB).

Based on the data of the wiring layout in the wiring board DB, a mask to form a wiring pattern is generated, and, a wiring board is manufactured at S04. Finally, at S05, the electronic components are installed on the wiring board that was manufactured in S04.

The design method of the on-board wiring of the present disclosure is performed, as indicated by the dashed line in FIG. 1, in an electronic circuit board design and manufacturing process. In other words, the design method of the present disclosure is performed at S03 after a completion of the circuit design at S02, which determines the circuit-formulating electronic components and generates a circuit netlist.

Figure 2:
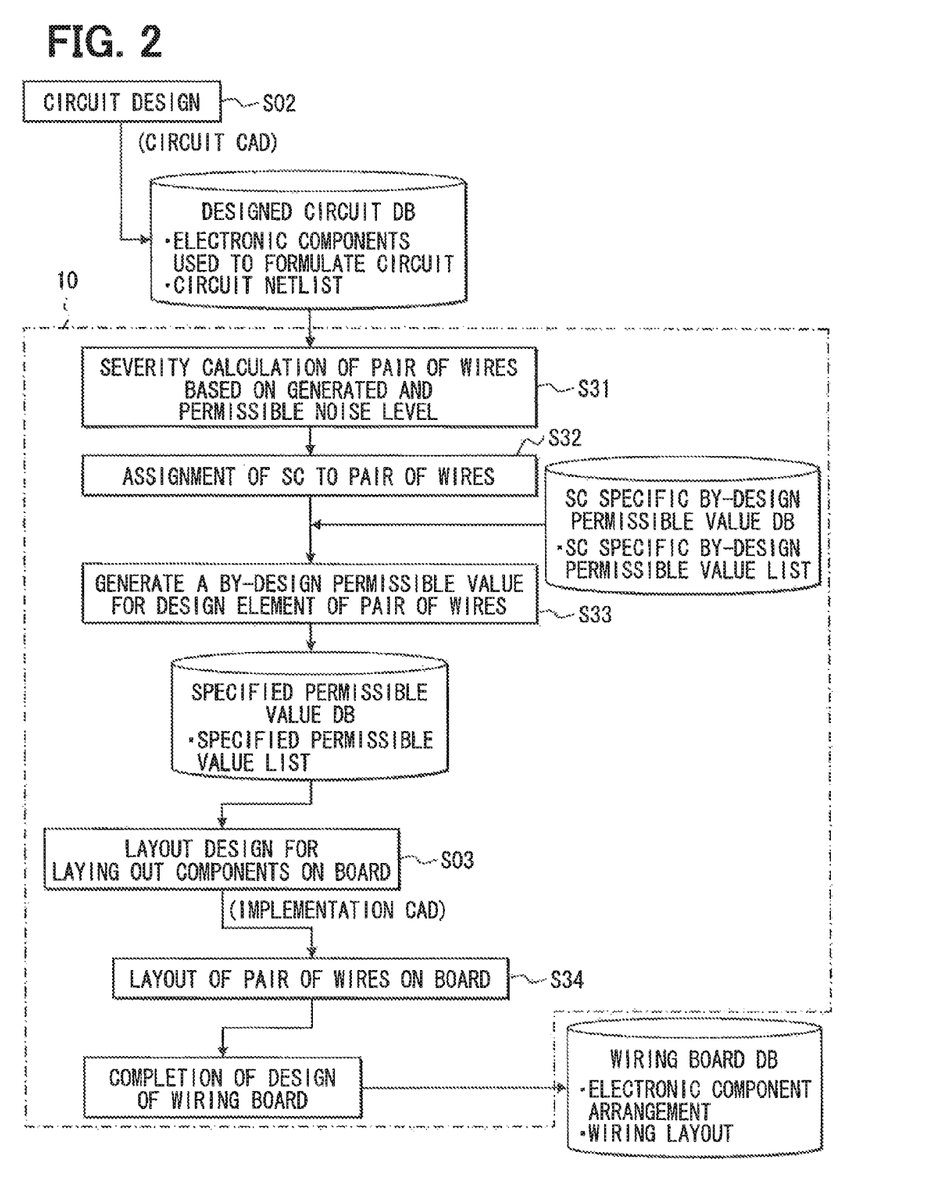
FIG. 2 is a detailed illustration of the design method of the on-board wiring of FIG. 1.

With reference to FIG. 2, an on-board wiring design method 10 (i.e., design method 10 hereinafter), which is the design method of the on-board wiring of the present disclosure, is shown.

In the design method 10, the following steps are added to the outline of the design and manufacturing process of the electronic circuit board after the circuit design of S02. At S31 a severity of a pair of wires is calculated based on a generated noise level and a permissible noise level. At S32 a severity class (SC) is assigned to the pair of wires. At S33 a by-design permissible value for a design element of the pair of wires is specified. Further, at S34 the pair of wires on the board are laid out, which is the layout design of the board, based on the by-design permissible value specified at S33.

In the design method 10 of FIG. 2, at S31 a severity calculation for the circuit design derived in S02 is performed as a crosstalk prevention index for a pair of wires based on a generated noise level of a damaging side wire and a permissible noise level of a damaged side wire. The damaging side wire, such as a noisy wire, damages or influences via crosstalk another wire, such as a sensitive wire, which is referred to as the damaged side wire. At S32, a severity class (SC) is assigned to the pair of wires (i.e., a severity class assignment). Specifically, based on the severity calculated at S31, a severity class that is pre-defined according to a value range of severity is assigned to the pair of wires. At S33 a by-permissible value list is generated to specify, for a design element of the pair of wires, one or more by-design permissible values belonging to the severity class that has been assigned to the pair of wires, based on a predetermined severity class specific permissible value list. At S34, the pair of wires is laid out on the board based on the by-design permissible value specified at S33.

In the design method 10 of FIG. 2, at S31 a severity calculation for the circuit design derived in S02 is performed as a crosstalk prevention index for a pair of wires based on a generated noise level of a damaging side wire and a permissible noise level of a damaged side wire. The damaging side wire, such as a noisy wire, damages or influences via crosstalk another wire, such as a sensitive wire, which is referred to as the damaged side wire. At S32, a severity class (SC) is assigned to the pair of wires (i.e., a severity class assignment). Specifically, based on the severity calculated at S31, a severity class that is pre-defined according to a value range of severity is assigned to the pair of wires. At S33 a by-design permissible value list is generated to specify, for a design element of the pair of wires, one or more by-design permissible values belonging to the severity class that has been assigned to the pair of wires, based on a predetermined severity class specific permissible value list. At S34, the pair of wires is laid out on the board based on the by-design permissible value specified at S33.

In S31 of the design method 10 of the on-board wiring of FIG. 2, a severity calculation of a designed circuit is performed to calculate severity as a crosstalk prevention index for a pair of wires based on a generated noise level of a damaging side wire and a permissible noise level of a damaged side wire.

Figure 3:
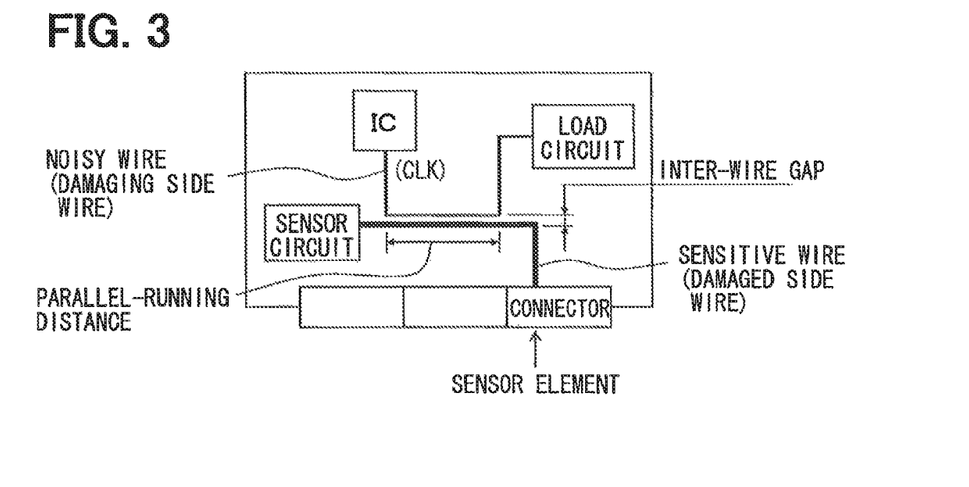
FIG. 3 is an illustration of a pair of wires including a damaging side wire and a damaged side wire on an electric circuit board of an engine ECU to be used in a vehicle.
Figure 4:
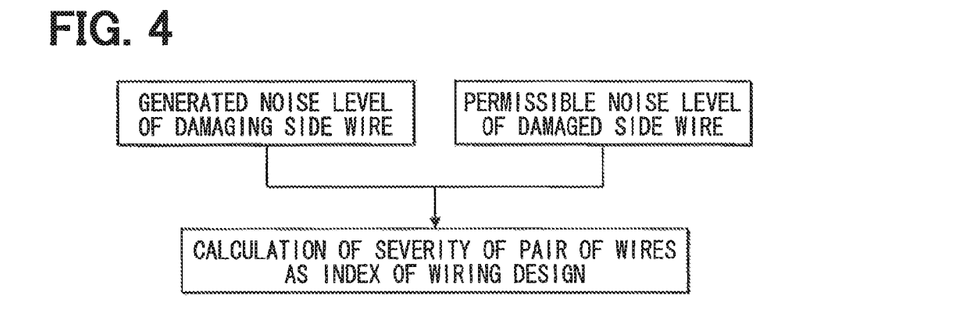
FIG. 4 is an illustration of severity calculation process of S31 of the design method of FIG. 2.

FIG. 3 is an illustration of a pair of wires including a damaging side wire and a damaged side wire regarding a noise on an electronic circuit board of an engine ECU to be used in a vehicle. Further, FIG. 4 is an illustration of S31 of the design method 10 of FIG. 2, illustrating the details of the process.

In the engine ECU, which is installed in the vehicle, a mixed arrangement of noisy wiring and sensitive wiring on one wiring board will present a crosstalk-prone condition. The noisy wire transmits a digital signal and the sensitive wire transmits a sensor signal, which is usually a weak signal. The engine ECU already having many components in a small area is further reduced in size to be squeezed into a small space in a vehicle, forcing the wiring board to have a high-density arrangement of the electronic components. Further, an increase of a clock frequency of a microcomputer, which is required in pursuit of a high-speed microcomputer and of sophistication of the engine ECU functions, makes the crosstalk-prone condition worse.

The damaging side wire is a wire connected to a clock signal terminal of an integrated circuit (i.e., IC) if, for example the noise source is such an IC and a clock signal. In such case, a generated noise level [dBµV] is a measurement of a clock signal level at the clock signal terminal.

Further, the damaged side wire is a wire connected to a connector terminal if, for example, a weak sensor signal is input to such connector terminal. In such case, a permissible noise level [dBµV] is a noise level permitted at such connector terminal.

Once the generated noise level of the damaging side wire and the permissible noise level of the damaged side wire are known, the following equation 1 may be used to calculate a limit coupling coefficient [dB].

$$\text{Limit coupling coefficient [dB]} = \text{Permissible noise level [dBµV]} - \text{Generated noise level [dBµV]} \quad \text{Equation 1}$$

The limit coupling coefficient is an upper limit value of a coupling coefficient between two wires, which are the wire connected to an IC terminal on the damaging side and the wire connected to a connector terminal on the damaged side (FIG. 3). If the coefficient exceeds such limit value, a crosstalk is generated between the two wires.

For an intuitive understanding of the crosstalk preventing wiring design between two wires, a "severity" index is introduced, according to equation 2.

$$\text{Severity [dB]} = \text{Generated noise level [dBµV]} - \text{Permissible noise level [dBµV]} \quad \text{Equation 2}$$

The calculation of severity to be performed at S31 is a calculation of equation 2. Further, the severity is an index of circuit design for preventing crosstalk, which will be more clearly described in detail with reference to FIG. 4. Based on equation 2, the severity and the limit coupling coefficient are "reversed" number with each other. In other words, the greater the generated noise level is, or the smaller the permissible noise level is, the greater the severity is (or the smaller the limit coupling coefficient is), which means that no coupling is permissible.

In this case, the severity calculation may be performed for only one pair of wires, or for many pairs of wires. Therefore, the severity may be calculated for all pairs of wires in the designed circuit, or the severity may be calculated selectively for certain pairs of wires that are considered to be prone to crosstalk.

In the following, for the description of the design method of on-board wiring of the present disclosure, the term "severity" is mainly used. However, according to the conversion based on equations 1 and 2, the term "limit coupling coefficient" may be equally used. That is, both terms are equivalent in the following description.

In S32 of the design method 10, a severity class (SC) having a pre-defined value range of severity is assigned to the pair of wires, based on the severity calculated at S31.

The SC is, as described above, a classification of the value range of severity about a pair of wires on the damaging side and the damaged side.

Since the severity is an index for preventing crosstalk, the severity class may be defined as a value range of the severity, for the rough classification of severity against crosstalk. The severity for each pair of wires is calculated by using equation 2, and each pair of wires has a severity class assigned thereto based on the calculated value of severity. That is, each pair of wires is roughly classified into a certain severity class, in terms of crosstalk-resistant characteristics, according to the severity class assigned thereto.

At S33 of the design method 10, based on the preset SC specific permissible value list, a specified permissible value list is generated for a target pair of wires by specifying one or more by-design permissible values belonging to the severity class that has been assigned to the pair of wires, for each of design elements of such pair of wires.

The crosstalk between the wires mainly depends on a coupling coefficient between the wires. Further, design elements that affect the coupling coefficient between the wires include a gap between the wires and a parallel-running distance of the wires running in parallel (FIG. 3). Further, the length of the wire, the width of the wire, the layer of the wire, the interlayer thickness, the dielectric constant of the board, the thickness of the wire (i.e., copper foil), the distance from a ground pattern may also affect crosstalk. In the following, the design method 10 uses the gap between the wires and the parallel-running distance as the main design elements related to crosstalk.

As described above, the important design parameter regarding crosstalk is a coupling coefficient between the wires, and the main design elements are a gap between two parallel-running wires and a parallel-running distance of the two parallel-running wires. Further, as an index for preventing crosstalk, the severity, or the limit coupling coefficient is used, which can be calculated by using equation 2 (or equation 1), based on, for example, a product specification of an engine ECU.

As a design procedure of the on-board wiring, it is desirable to list a few standard by-design permissible values (i.e., permissible limit values) regarding the main design elements that affect the crosstalk between the wires for the standardization of the crosstalk-preventing wiring design. Further, by performing the layout of the wiring based on such by-design permissible value list, the design time for an actual wiring design may be reduced.

In the design method of the on-board wiring of the present disclosure, the SC (i.e., severity class) specific by-design permissible value list is used, i.e., is prepared in advance, as the by-design permissible value list, for the wiring design.

The SC specific by-design permissible value list used at S33 is generated by listing a few standard by-design permissible values for the main design elements of pair of wires, to which the severity class classifying the value range of severity has already been assigned as an index of severity of (i.e., "likeliness" to have) a crosstalk. By using such SC specific by-design permissible value list, each pair of wires has a by-design permissible value that is suitable for the assigned SC, regarding the main design elements. Therefore, in such manner, the wiring design is basically made to be crosstalk-free.

Figure 5:
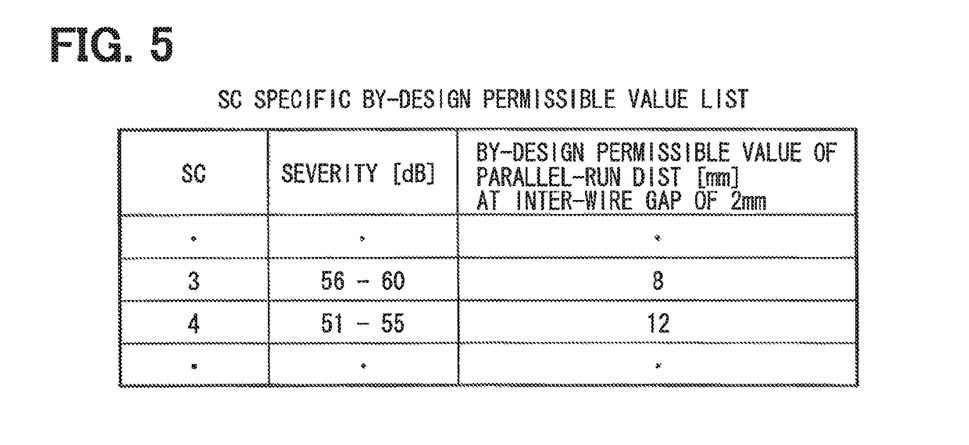
FIG. 5 is an illustration of a severity-classified permissible value list for listing by-design permissible values.
Figure 6A:
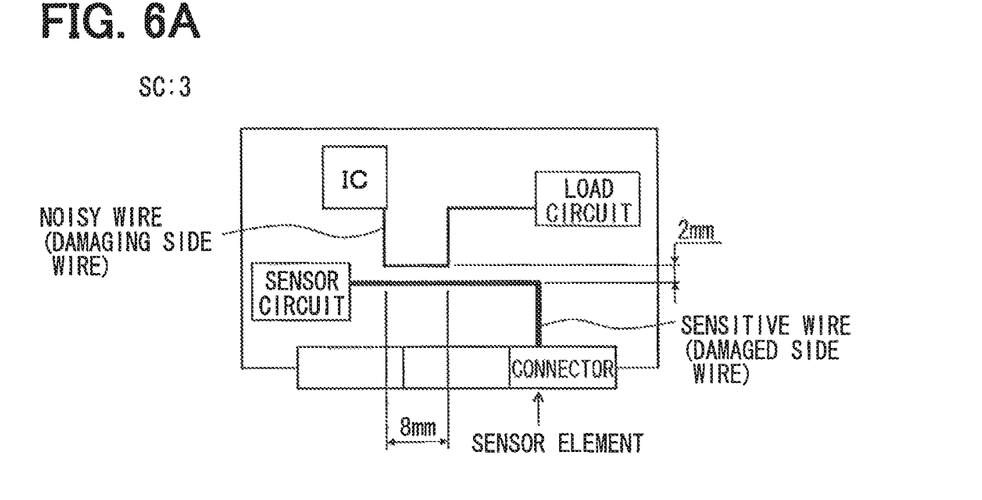
FIGS. 6A, 6B are illustrations of a pair of wires designed according to the severity-classified permissible value list of FIG. 5.
Figure 6B:
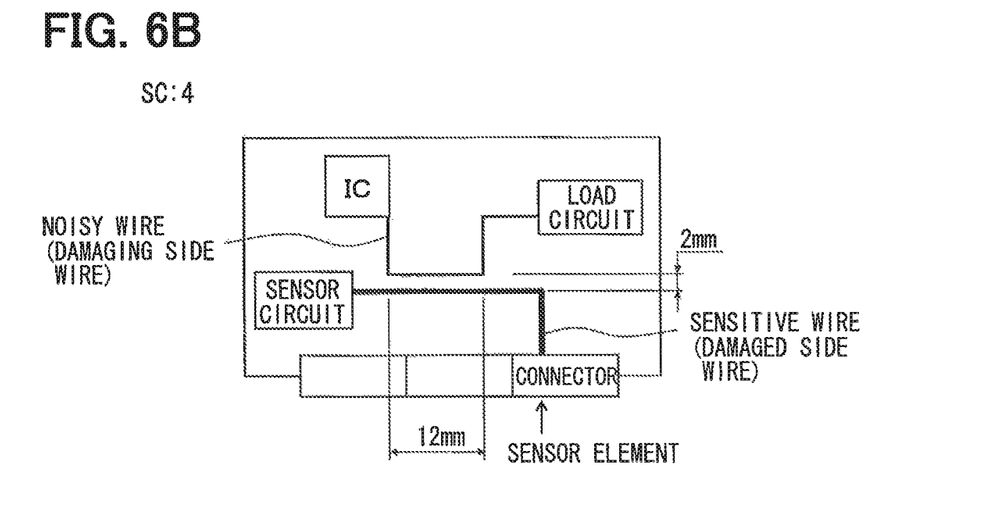

FIG. 5 is an example of the SC specific by-design permissible value list in the simplest form, in which each of the severity classes has one by-design permissible value assigned thereto. Further, FIGS. 6A and 6B are illustrations of a pair of wires according to the by-design permissible values of SC3 and SC4, which are listed and specified in the SC specific by-design permissible of FIG. 5.

Further, one by-design permissible value may be listed for each of the SCs, as shown in FIG. 5. Alternatively, for more securely realizing a crosstalk-free on-board wiring, multiple by-design permissible values may be listed for each of the SCs.

Further, the gap between the wires and the parallel-running distance ("parallel-run dist" in FIGS) of the parallel wires are the main design elements that affect the crosstalk between the wires. However, when a board type is changed, the dielectric constant of the board is also considered as the main design element having an influence on the crosstalk between wires. Therefore, it is preferable to set more than one SC specific by-design permissible value lists for the variation of the dielectric constants of the board.

At S33, a few by-design permissible values for the assigned SC, which have been assigned to the pair of wires, are specified for each of the pairs of wires to generate the list of the specified permissible values.

Figure 7:
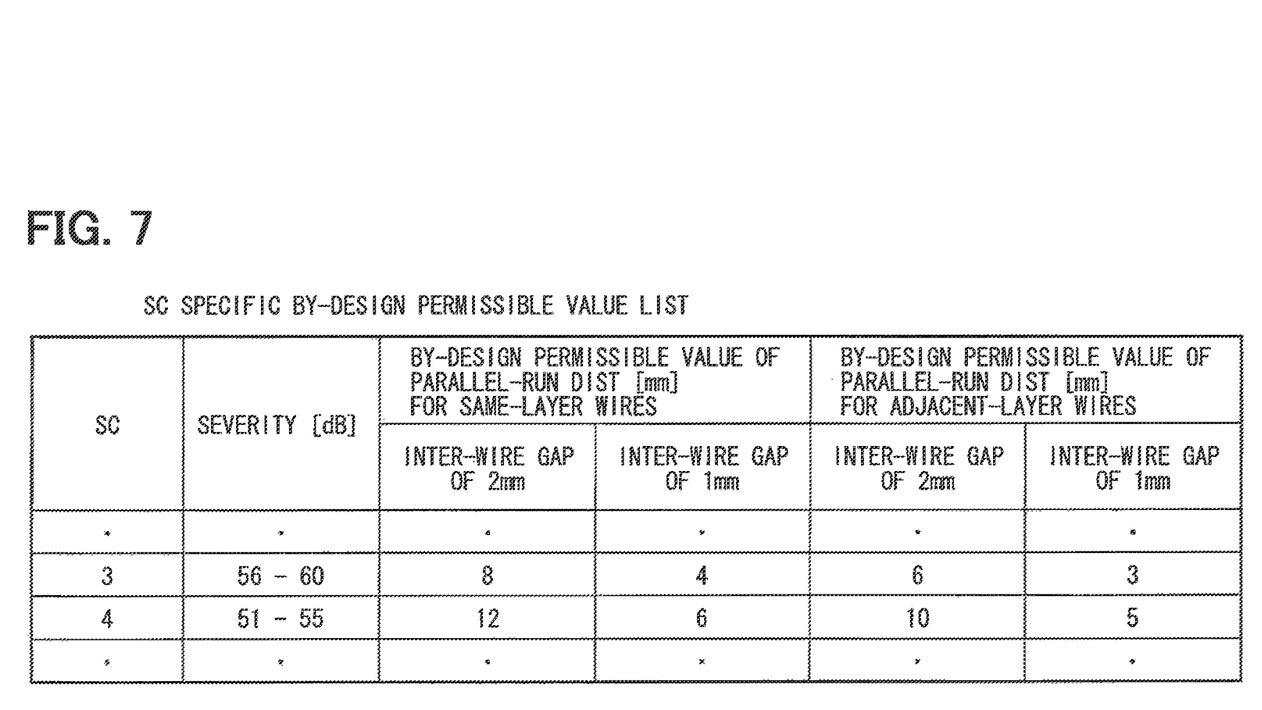
FIG. 7 is an illustration of a security class specific by-design permissible value list.
Figure 8:
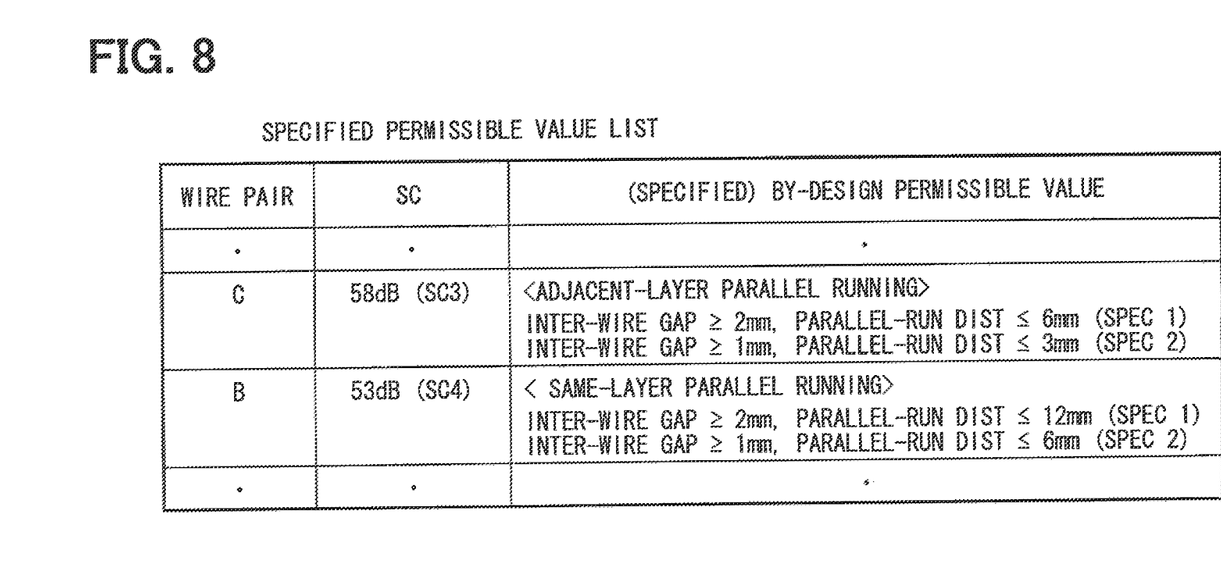
FIG. 8 is an illustration of a specified permissible value list, specifying, for each pair of wires, a plurality of permissible values based on FIG. 7.

FIGS. 7 and 8 are illustrations of specifying multiple by-design permissible values. FIG. 7 is, more specifically, another example of the SC specific by-design permissible value list, which is referred to in S33 of the design method 10. FIG. 8 is an example of the specified permissible value list, specifying, for the design element of each pair of wires, multiple by-design permissible values based on the SC specific by-design permissible value list of FIG. 7.

In the SC specific by-design permissible value list of FIG. 7, two by-design permissible values are listed for each of the layer-related configurations of wire pair (i.e., same-layer parallel wire pair and adjacent-layer parallel wire pair), for the classes of SC3 and SC4. Further, in FIG. 8, two by-design permissible values are specified for the adjacent-layer wire pair C with the severity of 58 dB (SC3) and for the same-layer wire pair B with the severity of 53 dB (SC4).

Finally, at S34 of the design method 10, each pair of wires is laid out on the board based on the specified by-design permissible value.

As described above, the design method of on-board wiring uses the "severity" as an index for preventing crosstalk, sets and specifies in advance a "SC specific by-design permissible value list" for the main design elements of the pair of wires that affect crosstalk, and performs a layout design of the pair of wires based on such index and list.

The wiring layout of the conventional on-board wiring technique has been performed based on an experience-based by-design standard value, which has been applied to the main design elements of the pair of wires. However, a by-design standard value in the conventional technique is not classified as the one in the present application, which uses the SC specific by-design permissible value list for the classification of standard values.

Further, the by-design standard values have been used in the conventional design method in a severity-first manner, in which the severest (i.e., the lowest) adjacent spacing condition is used first for all the wiring for making a trial product or for a simulation. Based on the noise analysis of such trial product/simulation, the first by-design standard value is changed to the next by-design standard value for further trial, if faulty portions are found in the trial product. Such cycles of trial and error are repeated many times in the conventional method.

In contrast, the design method 10 of on-board wiring in the present disclosure uses a preset SC specific by-design permissible value list for performing the wiring layout by using the permissible by-design value that is suitable for the severity of the evaluated pair of wires. The preset SC specific by-design permissible value is prepared in advance by evaluating the severity of the pair of wires in the designed circuit, which include a damaging side wire and a damaged side wire in the designed circuit. In such manner, the design method of the present disclosure is finished basically by performing the layout design once, thereby making it unnecessary to repeat the layout design and the noise analysis in a trial-and-error cycle and making the layout design process more efficient.

Further, in case of designing a board to be used in an engine ECU, the number of the pairs of wires is quite large. However, according to the procedure of the design method, if multiple pairs of wires are pre-identified (i.e., a damaging side wire and a damaged side wire) to be problematic in an engine ECU, the severity-considered wiring layout is limited only to such multiple pairs of wiring, for performing either an automatic or a manual layout.

Further, the design method may consider the severity of all pairs of wires on the wiring board of the engine ECU, and may also be performed automatically or manually.

The on-board wiring design method of the present disclosure, which, by eliminating the conventional cycle of trials and errors for performing layout designs and noise analyses, enables an efficient design of crosstalk prevented wiring boards.

With regard to the design method 10 of FIG. 2 in S31, a configuration of a preferable process for handing a situation where at least one of the generated noise level and the permissible noise level is frequency-dependent.

Figure 9:
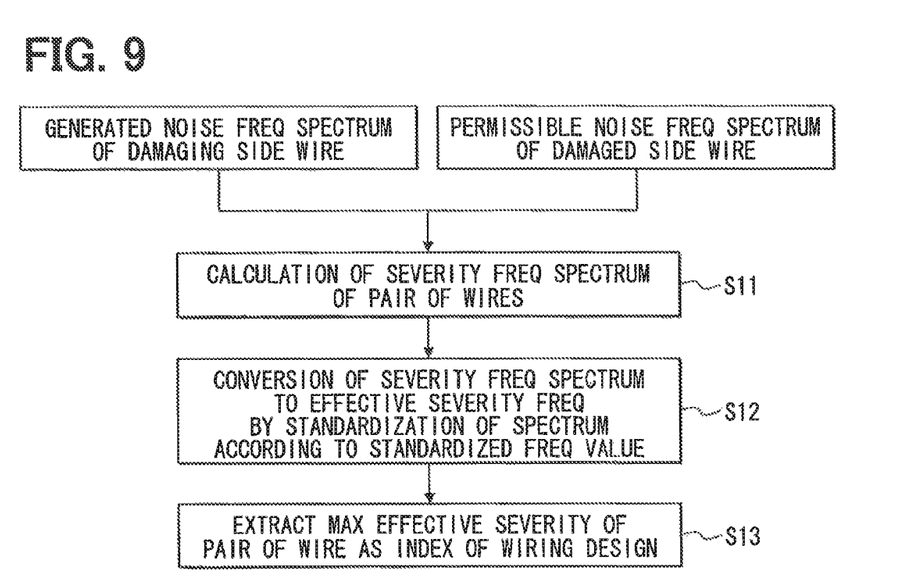
FIG. 9 is an illustration of severity calculation process of S31 of the design method of FIG. 2 for a generated noise level and/or a permissible noise level that are frequency-dependent.

FIG. 9 is an illustration of S31 of the design method 10, which replaces FIG. 4, when at least one of the generated noise level and the permissible noise level is frequency-dependent.

Figure 10:
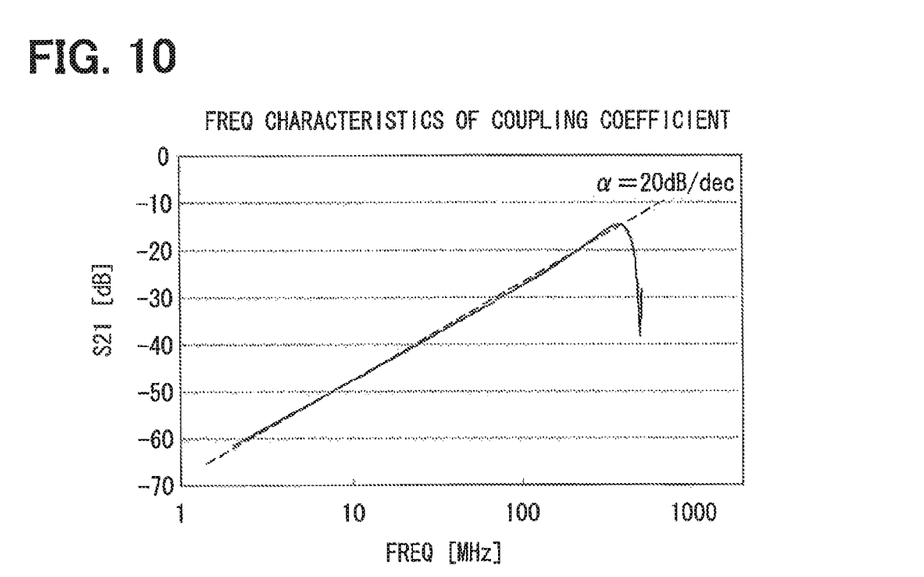
FIG. 10 is a diagram of frequency characteristics of a coupling coefficient based on a cross-talk parameter actually measured for 100 mm parallel-running wires on a board.

FIG. 10 is a diagram of a measurement result about a $S_{21}$ parameter (i.e., element of a scattering matrix) representing a crosstalk for evaluating the frequency characteristic of the coupling coefficient regarding 100 mm parallel wires arranged (i.e., formed) on a FR4 board. The frequency-dependency of the coupling coefficient for the parallel wires due to the electro-magnetic coupling is used to convert the severity frequency spectrum to the effective severity frequency spectrum in S12.

Further, FIGS. 11A, 11B, 12A, 12B are illustrations regarding the practical examples of processes of FIG. 9.

The procedures of S31 of the design method 10 of FIG. 2 may preferably be configured to have steps of FIG. 9, instead of steps of FIG. 4, when at least one of the generated noise level of the damaging side wire and the permissible noise level of the damaged side is frequency-dependent. Per FIG. 9, the severity frequency spectrum of the pair of wires is calculated at S11, the severity frequency spectrum is standardized according to a standardization frequency value and is converted to the effective severity frequency spectrum at S12, and the maximum effective severity of the pair of wires is extracted as an index of the wiring design at S13.

In S11, based on the generated noise frequency spectrum of the damaging side wire and the permissible noise frequency spectrum of the damaged side wire, the process calculates a severity frequency spectrum by using equation 2.

In S12, the process standardizes the severity frequency spectrum provided in S11 according to a specific standardization frequency value that considers the frequency dependency of the coupling coefficient between the parallel wires due to the electro-magnetic coupling, and converts such spectrum to the effective severity frequency spectrum.

Further, in S13, the process extracts, in place of the severity of FIG. 4, the maximum effective severity, i.e., the maximum value of the effective severity frequency spectrum provided in S12, as an index for preventing a crosstalk.

About a noise source such as the clock signal output by an IC, the noise frequency (i.e., a clock frequency and a harmonic frequency) is known, which is made up by a single frequency and has a high noise level in a pulse shape. However, the generated noise level on the damaging side and the permissible noise level on the damaged side are, in general, frequency-dependent successive values, thereby being represented as the generated noise frequency spectrum and the permissible noise level spectrum. Therefore, when the generated and the permissible noise levels have frequency dependency, the severity of S31 of FIG. 2, which is calculated by using equation 2, may also be calculated as the severity frequency spectrum, as the one in S11 of FIG. 9.

Figure 11A:
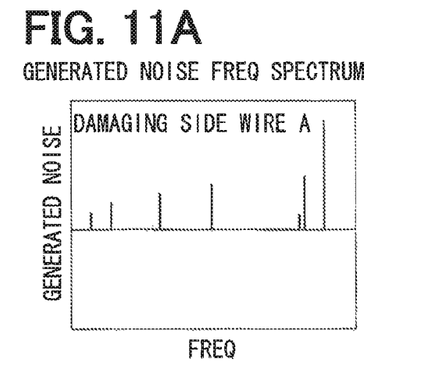
FIGS. 11A, 11B, 11C, 11D are illustrations of generated and permissible noise frequency spectrums based on FIG. 9.
Figure 11B:
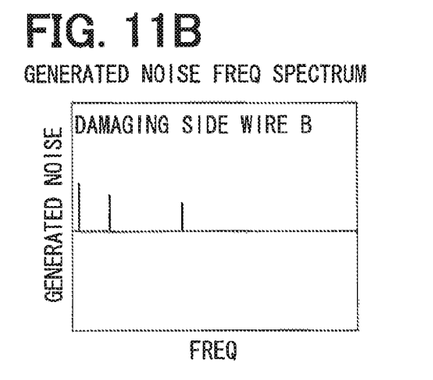
Figure 11C:
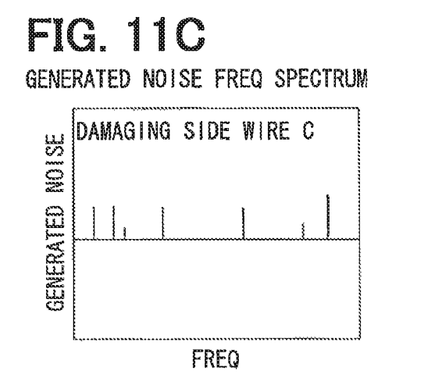
Figure 11D:
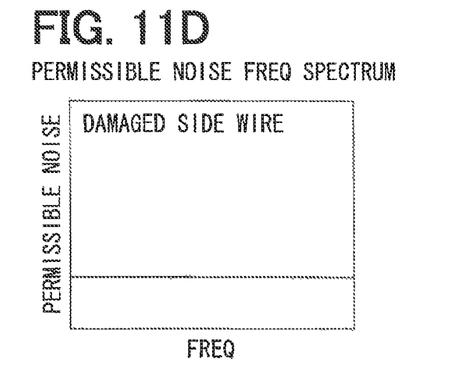

FIGS. 11A to 11C show an example of the generated noise frequency spectrum and FIG. 11D shoes an example of the permissible noise frequency spectrum.

The generated noise frequency spectrum (FIGS. 11A to 11C) is an example of the frequency-dependency of the generated noise level of the damaging side. In this example, three patterns of generated noise frequency spectrum regarding damaging side wires A to C respectively show pulse-shape noises being superposed onto a base level white noise, the white noise common to all three patterns.

On the other hand, the permissible noise frequency spectrum shown in FIG. 11D is an example of the permissible noise level not dependent on frequency, defining a constant permissible noise level for all frequencies.

Figure 12A:
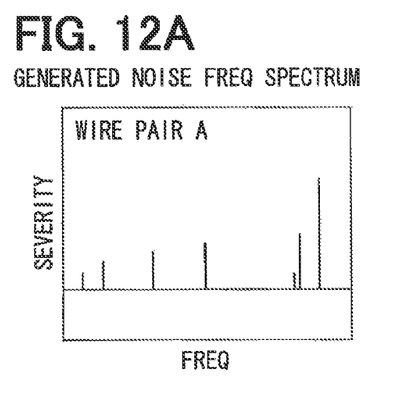
FIGS. 12A, 12B, 12C are illustrations of frequency spectrums, regarding calculated severity frequency spectrums for three pairs of wires A to C.
Figure 12B:
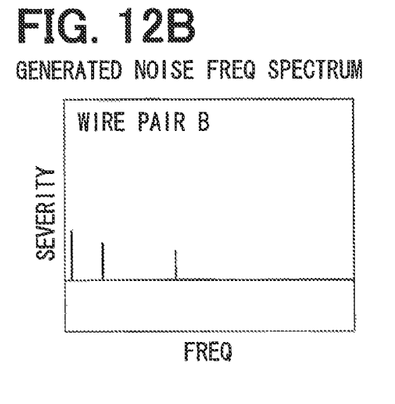
Figure 12C:
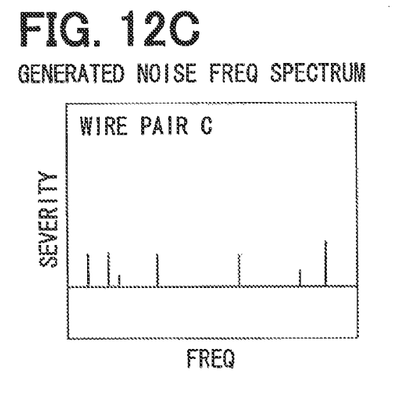

FIGS. 12A to 12C respectively illustrate the severity frequency spectrum of each of the pairs A to C of wires, calculated by using equation 2. Each of such pairs A to C is a combination between each of the damaging side wires A to C and the damaged side wire in FIGS. 11A to 11D.

When at least one of the generated noise level and the permissible noise level frequency is frequency-dependent, the severity calculated by equation 2 also becomes frequency-dependent, as shown in FIGS. 12A to 12C, thereby generating a severity frequency spectrum.

On the other hand, it is physically impossible for preventing crosstalk to change the by-design permissible value of the design elements of certain pairs of wires, for each of the noise frequencies. Therefore, for the purpose of specifying a suitable by-design permissible value of the design elements for preventing the crosstalk in all frequency ranges, it is necessary to extract one appropriate severity value from the severity frequency spectrum shown in FIGS. 12A to 12C, as an index of preventing the crosstalk.

How the crosstalk is caused (i.e., coupled) is classified into two types, a static coupling and an inductive coupling. The static coupling is regarding the coupling of the electric fields through an inter-object capacitance of two conducting objects when the voltage difference is observed between two closely-located objects. The inductive coupling is regarding the induction of an electric current in one circuit when a changing magnetic flux caused by a loop electric current in another closely-located circuit interlinks two circuits. In an actual coupling situation, both of two types of coupling co-exists. However, which one of the two coupling becomes dominant is predictable based on a load impedance of the circuit.

In the following, the index calculation method for preventing crosstalk is described based on the static-coupling-dominant severity frequency spectrum in which the static coupling is dominant. The index calculation method of the inductive coupling dominant case also uses similar relationships. Therefore, the on-board wiring design method in the following description is valid for a general electro-magnetic coupling, which is a combination of the static coupling and the inductive coupling.

According to the theory of electro-magnetic inductance, the coupling coefficient between parallel-running wires by the static coupling increases in a low frequency range in which no resonance phenomenon is observed. The increase of the coupling coefficient having a slope of $\alpha$=20 dB/dec in proportion to an increase of frequency, thereby more easily inducing a crosstalk between wires according to the increase of the frequency.

As described before, FIG. 10 is a diagram of a measurement result about the S21 parameter representing a crosstalk for evaluating the frequency characteristic of the coupling coefficient regarding 100 mm parallel wires arranged (i.e., formed) on a FR4 board. The parallel wires on the FR4 board used for such measurement causes the resonance phenomenon at about 300 MHz. However, in a frequency range under 300 MHz, the S21 parameter increases by the slope of $\alpha$=20 dB/dec in proportion to an increase of frequency.

Therefore, in S12 of FIG. 9, the process standardizes the severity frequency spectrum according to a specific standardization frequency value (e.g., 80 MHz in this case) that takes into consideration the slope a for the conversion of such frequency spectrum to the effective severity frequency spectrum. In other words, when the severity at before-standardization frequency of f [MHz] is designated as V(f), the effective severity after standardization at the standardization frequency of 80 [MHz] is designated as $V_{80}(f)$, the conversion equation is formulated as equation 3.

$$V_{80}(f)=V(f)+20\cdot(f/80)$$ Equation 3—

Further, in S13 of FIG. 9, the maximum value of the effective severity frequency spectrum is used as the maximum effective severity. Such maximum effective severity is used as an index for preventing crosstalk then the generated noise level and the permissible noise level are frequency-dependent.

Further, in S32 of FIG. 2, the severity class (SC) described above is assigned to the pair of wires based on the maximum effective severity value extracted in S13.

Figure 13A:
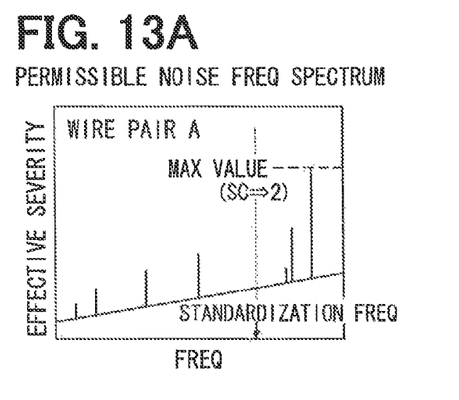
FIGS. 13A, 13B, 13C are illustrations of effective severity frequency spectrums for three pairs of wires A to C with the maximum severity values extracted therefrom.
Figure 13B:
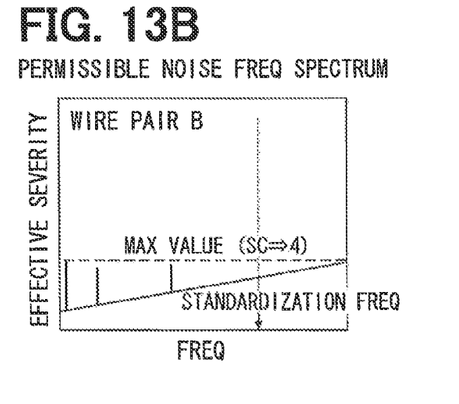
Figure 13C:
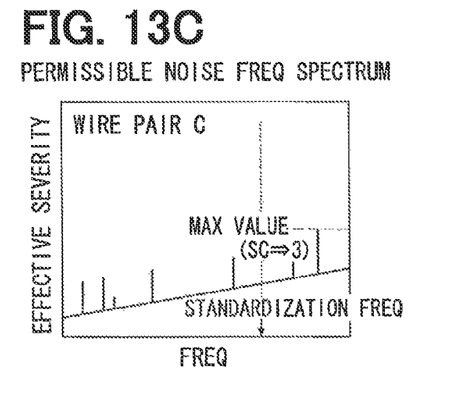

FIGS. 13A to 13C respectively illustrate the effective severity frequency spectrum that is converted from the severity frequency spectrum of FIGS. 12A to 12C by using equation 3, and the maximum effective severity extracted therefrom as an index for preventing crosstalk for each of the wire pairs A to C. Based on the extracted maximum effective severity, the wire pair A has SC2 assigned thereto, and the wire pair B has SC4 assigned thereto, and the wire pair C has SC3 assigned thereto.

Further, in the measurement result of FIG. 10 regarding the parallel wires on the FR4 board, the S21 parameter has a slope of 20 dB/dec in a low frequency range under 300 MHz. The slope α and equation 3 are valid only for the frequency range under 300 MHz, where no resonance phenomenon is observed for the coupling coefficient between the parallel wires.

However, if the slope α and equation 3 are assumed to be valid in the higher frequency range, the maximum effective severity may be able to serve as an index for preventing crosstalk, rather on a safe side with a somewhat lower accuracy. In other words, the maximum effective severity is a restrictive index, with which the crosstalk will less likely be caused. Therefore, the maximum effective severity serves as an index for effectively preventing the crosstalk on a worst possible condition for all frequency ranges. That is, by using the maximum effective severity for all (high+low) frequency ranges, the crosstalk of a pair of wires having the worst (i.e., severest) condition is prevented.

Further, the method of standardizing the severity value of each frequency according to a specific standardization frequency by using the slope α and equation 3 and extracting the maximum effective severity for use as an index for preventing the crosstalk is applicable not only to the generated noise level of the damaging side and/or the permissible noise level of the damaged side taking frequency-dependent successive values but also to the noise such as a clock signal from an IC, which has a known frequency (i.e., a single frequency) and is formed in a pulse shape with high noise level.

The SC specific by-design permissible value list is valid "as is" when the maximum effective severity is used as an index for preventing the crosstalk and at least one of the generated noise level on the damaging side and the permissible noise level on the damaged side has frequency-dependency. Further, the standardization frequency for the calculation of the maximum effective severity may be set to a certain frequency in advance. Thus, a database of the SC specific by-design permissible value list can be constructed in advance before performing the wiring design.

Per the on-board wiring design method 10 of FIG. 2, when there are many (i.e., multiple) crosstalk prone pairs of wires in the designed circuit and each of those pairs is required to have the severity calculation in a course of designing a circuit layout, the layout of those pairs may preferably be performed in a descending order of severity.

The pair of wires having a high severity is a pair of wires that are more prone to cause crosstalk. Therefore, the by-design permissible value for the design elements of such pair of wires fulfills a more severe condition for preventing crosstalk than the lower-severity pair of wires. Thus, by performing the layout of multiple pairs of wires in a descending order of severity, the crosstalk is more securely prevented, and, after such crosstalk preventing layout, the wiring board layout design is enabled to have a smaller board size due to the high-density arrangement of the multiple pairs of wires.

The design elements of the above pairs of wires in the design method of on-board wiring may preferably be a parallel-running distance and an inter-wire gap for a parallel-running portion of wires, which greatly affect the coupling coefficient between the wires as described above.

Further, when the design method of on-board wiring is applied to various kinds of board, one or more of the SC specific by-design permissible value lists are preferably set for each of the dielectric constants. Further, it may be preferable that one or more of the above value lists are set for each of the layer structures and for each of the inter-layer thicknesses.

In the design method of on-board wiring described above, at least one pair of wires may be a wire connected to the IC terminal on the damaging side and a wire connected to the connector terminal on the damaged side, for example. Further, in such case, the damaging side IC terminal may be an output terminal for outputting the clock signal, and the damaged side connector terminal may be an input terminal for inputting the sensor signal.

As shown in the above description, the design method of on-board wiring in the present disclosure is new and advantageous, obscuring the conventional method of trial and error, in terms of enabling an efficient design of crosstalk-prevented wiring boards by eliminating the noise analysis of the layout-designed wiring board.

Therefore, the design method of on-board wiring described above may be preferably applicable to the on-board wiring design of a board in an in-vehicle electronic control unit, for the arrangement of a high-density implementation board having closely-located mixtures of noisy wires and sensitive wires, which is crosstalk prone.

Although the present disclosure has been fully described in connection with the preferred embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. A design method of on-board wiring in a designed circuit, the method comprising:
   storing, within a database, in advance of calculating a severity as a crosstalk prevention index for a pair of wires, a severity class (SC) specific by-design permissible value list that classifies by-design permissible values according to a predefined SC;
   calculating, by a computer aided design (CAD) system, the severity as the crosstalk prevention index for the pair of wires based on a generated noise level of a damaging side wire and a permissible noise level of a damaged side wire, without noise analysis of a wiring board after designing a layout of the wiring board;
   assigning, by the CAD system, a SC to the pair of wires based on the severity determined for the pair of wires, the SC being pre-defined value ranges for severity classification;
   generating, by the CAD system, for a design element of the pair of wires, one or more by-design permissible values belonging to the SC that have been assigned to the pair of wires, based on the SC specific by-design permissible value list in the database; and
   then constructing, by the CAD system, a layout of the pair of wires on a board based on at least one of the by-design permissible values.

2. The design method of claim 1, wherein
   when at least one of the generated noise level and the permissible noise level is frequency-dependent,
   the method of calculating the severity further includes:
      calculating a severity frequency spectrum from the generated noise level of the damaging side wire and the permissible noise level of the damaged side wire,
      standardizing the severity frequency spectrum to have a specific standardization frequency value by considering the frequency dependency of a coupling coefficient between parallel wires due to the electro-magnetic coupling,
      converting the severity frequency spectrum to an effective severity frequency spectrum, and extracting a maximum severity from the effective severity frequency spectrum.

3. The design method of claim 1, wherein the designed circuit has multiple pairs of wires, and the layout of the multiple pairs of wires is performed in a descending order of severity.

4. The design method of claim 1, wherein the design elements of the pair of wires are an inter-wire gap and parallel-running distance of parallel-running wires.

5. The design method of claim 1, wherein a plurality of the by-design permissible value lists for the SC assigned to the pair of wires are set for each dielectric constants of the board.

6. The design method of claim 1, wherein at least one pair of wires is a wire connected to a damaging side IC terminal and a wire connected to a damaged side connector terminal.

7. The design method of claim 6, wherein the damaging side IC terminal is an output terminal of a clock signal.

8. The design method of claim 6, wherein the damaged side connector terminal is an input terminal of a sensor signal.

9. The design method of claim 1, wherein the design board is for an in-vehicle electronic control unit.

10. The design method of claim 1, wherein the severity is calculated consistent with an equation:

$$\text{severity [dB]} = \text{generated noise level [dB}\pi\text{V]} - \text{permissible noise level [dB}\pi\text{V]},$$

wherein
dB=decibels,
dBπV=decibel micro volt.

11. The design method of claim 10, wherein the generated noise level [dBπV] is a measurement of a clock signal level.

* * * * *

UNITED STATES PATENT AND TRADEMARK OFFICE
CERTIFICATE OF CORRECTION

| | | |
|---|---|---|
| PATENT NO. | : 8,745,562 B2 | Page 1 of 1 |
| APPLICATION NO. | : 13/705229 | |
| DATED | : June 3, 2014 | |
| INVENTOR(S) | : Masashi Inagaki et al. | |

It is certified that error appears in the above-identified patent and that said Letters Patent is hereby corrected as shown below:

On the Title Page, Item (54) and in the Specification, Column 1, title to read as follows:

DESIGN METHOD OF ON-BOARD WIRING

Signed and Sealed this
Twenty-third Day of September, 2014

Michelle K. Lee
*Deputy Director of the United States Patent and Trademark Office*